(No Model.)
J. BROADHEAD & J. T. HAINES.
TRANSPLANTER.
No. 416,898. Patented Dec. 10, 1889.
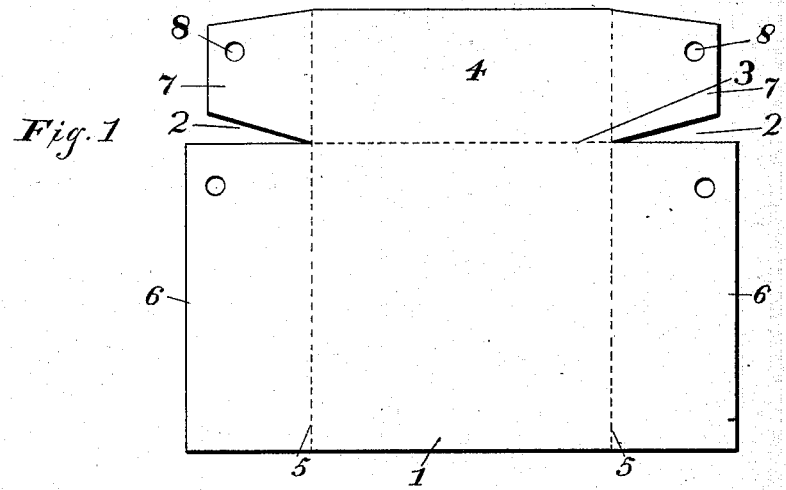
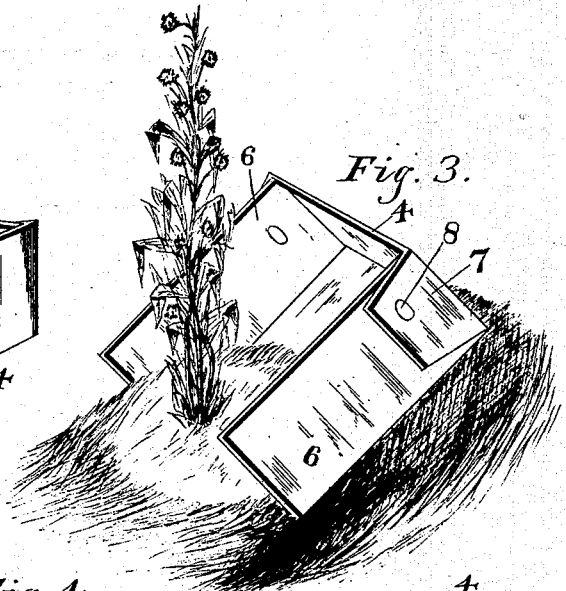
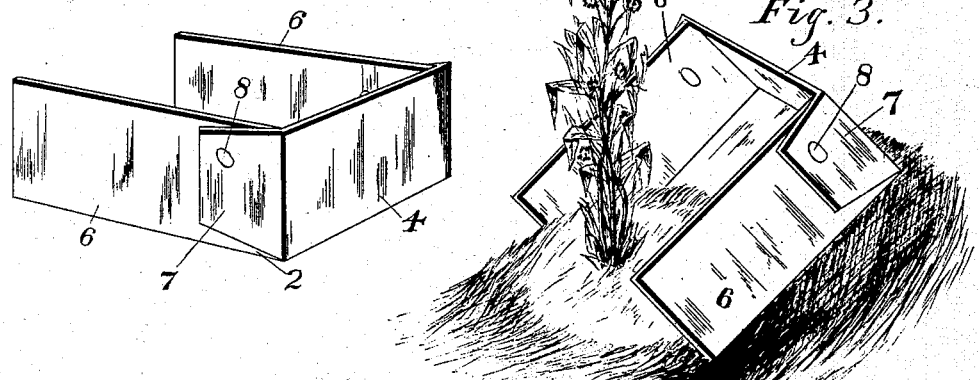
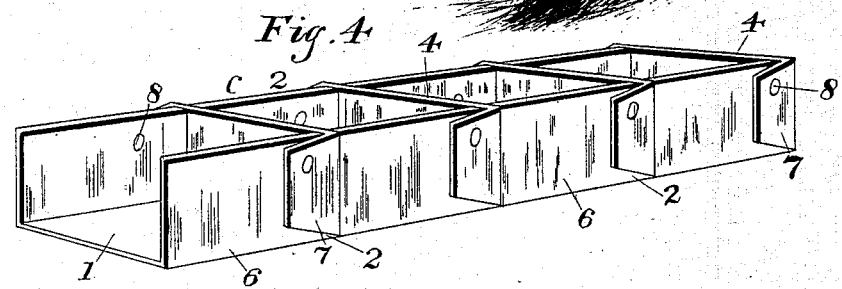
Witnesses:
J. M. Withrow
W. S. Duvall
Inventor
Joseph Broadhead
and Joseph T. Haines
By their Attorneys,
C. A. Snow & Co.
N. PETERS, Photo-Lithographer, Washington, D. C.

United States Patent Office.

JOSEPH BROADHEAD AND JOSEPH T. HAINES, OF LINWOOD, NEW JERSEY.

TRANSPLANTER.

SPECIFICATION forming part of Letters Patent No. 416,898, dated December 10, 1889.

Application filed June 18, 1889. Serial No. 314,693. (No model.)

*To all whom it may concern:*

Be it known that we, JOSEPH BROADHEAD and JOSEPH T. HAINES, citizens of the United States, residing at Linwood, in the county of Atlantic and State of New Jersey, have invented a new and useful Device for Transplanting Plants, of which the following is a specification.

This invention has relation to devices for transplanting plants, and among the objects in view are to provide a device adapted for the removal of plants and in such a manner as to include in its removal a sufficient quantity of the maternal earth surrounding the same as not to impede the progress of the plant after the same has been planted.

A further object of the invention is to provide the device at such a cost that it may be also used to transport the plant from place to place, and to so form the device as that a series of them when arranged as for transportation will coact one with the other to form a series of compartments each independent of the other to a certain extent and containing a separate plant provided with its own maternal earth.

With these general objects in view the invention consists in forming, preferably from a sheet-metal blank, a substantially rectangular shovel-shaped device, the blank being cut at its opposite corners, at one end thereof, and longitudinally and transversely folded and bent so that those portions thus cut may be bent around the edge and made to embrace the sides, which may be riveted thereto, all as will hereinafter appear, and be particularly pointed in the claim.

Referring to the drawings, Figure 1 represents a blank cut and adapted to be folded on dotted lines to form a device constructed in accordance with our invention. Fig. 2 is a perspective of the completed device. Fig. 3 shows our device in the act of removing a plant; Fig. 4, a series of devices constructed in accordance with our invention, the same being arranged for transportation.

Like numerals of reference indicate like parts in all the figures of the drawings.

In practicing our invention a blank, as 1, substantially square, is, near two of its opposite corners, provided with slits 2. Folds are then made from the end of one slot to the end of the other upon the dotted line 3, thus forming a back section 4. Other folds are made from rear to front upon the dotted lines 5 and parallel with the opposite edges of the blank and at a distance from the edges agreeing with the lengths of the slits 2, thus forming opposite sides 6, and on the ends of the section 4 side-embracing flaps 7. When the parts have been bent as described, the flaps 7 are riveted, as at 8, to their sides. This completes the device.

In operation we prefer, by the aid of a spade or other sod-cutting tool, to sever the loam at each side of the plants, as shown at A, and it now simply remains, as shown in Fig. 3, to insert the cutting end of the device into the earth and push the same forwardly under the plant and lift the device, plant, and adjacent earth from the ground. The plant is now ready for transportation and may be transplanted with a sufficient quantity of its maternal earth to guarantee its progress of growth and development.

A series of devices containing plants may be formed as shown in Fig. 4, the back of one device forming the front of the other, and in this manner a number of plants may be transported from place to place either for selling or transplanting.

Having described our invention, what we claim is—

The combination of a series of transplanting devices arranged so that the end walls of one will form an opposite end wall of the other, said devices consisting of a sheet-metal scoop-shaped transplanter provided with opposite sides 6, a rear wall 4, and side-embracing flaps 7, substantially as specified.

In testimony that we claim the foregoing as our own we have hereto affixed our signatures in presence of two witnesses.

JOSEPH BROADHEAD.
JOSEPH T. HAINES.

Witnesses:
JOSEPH R. RISLEY,
ELISHA S. SMITT.